United States Patent
Rittner et al.

(10) Patent No.: US 10,957,948 B2
(45) Date of Patent: Mar. 23, 2021

(54) HOUSING FOR AT LEAST ONE BATTERY MODULE AND BATTERY MODULE ASSEMBLY

(71) Applicant: AKASOL GMBH, Darmstadt (DE)

(72) Inventors: Kai Rittner, Riedstadt (DE); Stephen Raiser, Wiesbaden (DE)

(73) Assignee: AKASOL GMBH, Darmstadt (DE)

( * ) Notice: Subject to any disclaimer, the term of this patent is extended or adjusted under 35 U.S.C. 154(b) by 138 days.

(21) Appl. No.: 15/759,366

(22) PCT Filed: Sep. 9, 2015

(86) PCT No.: PCT/EP2015/070637
§ 371 (c)(1),
(2) Date: Mar. 12, 2018

(87) PCT Pub. No.: WO2017/041844
PCT Pub. Date: Mar. 16, 2017

(65) Prior Publication Data
US 2018/0183114 A1 Jun. 28, 2018

(51) Int. Cl.
| | |
|---|---|
| *H01M 10/613* | (2014.01) |
| *H01M 2/10* | (2006.01) |
| *H01M 10/658* | (2014.01) |
| *H01M 10/6556* | (2014.01) |
| *H01M 2/12* | (2006.01) |
| *H01M 10/6555* | (2014.01) |
| *H01M 10/647* | (2014.01) |

(52) U.S. Cl.
CPC ....... *H01M 10/613* (2015.04); *H01M 2/1077* (2013.01); *H01M 2/1094* (2013.01); *H01M 10/658* (2015.04); *H01M 10/6556* (2015.04); *H01M 2/1223* (2013.01); *H01M 10/647* (2015.04); *H01M 10/6555* (2015.04); *H01M 2220/20* (2013.01)

(58) Field of Classification Search
None
See application file for complete search history.

(56) References Cited

U.S. PATENT DOCUMENTS

2011/0262785 A1* 10/2011 Johnson .............. H01M 2/1083
429/66
2012/0018238 A1* 1/2012 Mizoguchi ........ H01M 10/6567
180/68.5

(Continued)

FOREIGN PATENT DOCUMENTS

| EP | 2897195 A1 | 7/2015 |
|---|---|---|
| WO | 2015086670 A2 | 6/2015 |

OTHER PUBLICATIONS

Matweb.com. 2020. Sorbothane Polyurethane Damping Material, 30 Durometer. [online] Available at: <http://www.matweb.com/search/datasheet_print.aspx?matguid=a7f50917d13f47a6b772c7b58e9e8ce8>. (Year: 2020).*

*Primary Examiner* — Robert S Carrico
(74) *Attorney, Agent, or Firm* — Vivacqua Crane (57) ABSTRACT

The present invention relates to a housing for at least one battery module, preferably for an arrangement of battery modules, with the at least one battery module comprising a plurality of battery cells arranged in a fluid cooled frame. The invention further relates to a battery module assembly comprising at least one battery module installed in a housing.

12 Claims, 6 Drawing Sheets

(56) References Cited

U.S. PATENT DOCUMENTS

| | | | |
|---|---|---|---|
| 2014/0356666 A1* | 12/2014 | Murata | H01M 10/6569 |
| | | | 429/83 |
| 2015/0147638 A1* | 5/2015 | Tamura | H01M 2/0277 |
| | | | 429/179 |
| 2015/0188105 A1 | 7/2015 | Sun | |
| 2015/0207119 A1* | 7/2015 | Onodera | H01M 2/1077 |
| | | | 429/89 |

* cited by examiner

HOUSING FOR AT LEAST ONE BATTERY MODULE AND BATTERY MODULE ASSEMBLY

RELATED APPLICATION

The present application is the national stage entry of international application no. PCT/EP2015/070637 filed Sep. 9, 2015 which is herein incorporated by reference.

FIELD

The present invention relates to a housing for at least one battery module, preferably for an arrangement of battery modules, with the at least one battery module comprising a plurality of battery cells arranged in a fluid cooled frame. The invention further relates to a battery module assembly comprising at least one battery module installed in a housing.

BACKGROUND

A battery module system which is assembled from a plurality of like battery modules can, for example, be designed in order to cover a power range having a content of energy of between 1 kWh and 400 kWh or more. When, for example, a battery module system is designed for a continuous power of 20 kW, peak powers of, for example, 100 kW can still be required from the battery for acceleration purposes on a short term basis, whereby excellent acceleration values can be achieved. One can work with a charging power of 40 kW, for example, during charging operations.

The above stated values are purely exemplary, however, on the other hand, represent values which can generally be achieved with commercially available lithium ion batteries.

In order to ensure a safe operation of the battery modules during use e.g. in a motor vehicle, or for a stationary battery module, the battery modules have to be installed in a housing that is adapted to protect the battery modules from external influences, such as rain, vibrations etc. that arise from the environment of use of the battery modules.

For this reason it is an object of the present invention to provide a housing for at least one battery module and a corresponding battery module assembly that can be operated in a variety of conditions, that can be produced in a reliable and cost effective manner and that provides protection against a plurality of different environmental conditions that are present during an operation of the battery module assembly.

SUMMARY

This object is satisfied in accordance with the invention by a housing comprising at least one safety related component, with the component having a safety related function.

In particular the housing may comprise at least one wall formed from a sandwich structure, the sandwich structure comprising a plurality of layers of different materials.

Such a sandwich structure can advantageously provide protection in the form of thermal insulation, as a mechanical damping means or as a fire resistant outer layer.

Preferably the at least one wall formed from a sandwich structure is a top wall or a bottom wall of the housing.

The loads and stresses on a housing for e.g. a moving battery assembly are greatest in the layers that are parallel with the surface of transport, installing the sandwich structure in a layer that is in parallel with the surface of transport thus ensures that these loads can be dissipated in the best possible way.

It should be noted that the side walls can be configured as a layer from a single kind of material to save weight. In this respect it is preferred if the material of the side wall comprises a metal such as steel or aluminum.

Preferably the sandwich structure comprises two to five layers, preferably three to four layers, of material, with adjacent layers being selected from different materials.

Advantageously both the top and the bottom wall of the housing comprise a sandwich structure. In this connection it must be noted that a sequence of layers can however be different e.g. reverse for the top and for the bottom layer, or different thicknesses of layers can be selected for each individual sandwich structure.

Preferably at least one layer of the plurality of layers of the sandwich structure comprises a material selected from the group of materials comprising steel, aluminum and foamed PET (poly ethylene), PUR, PVC, PST or other preferably foamed plastic material layers.

The use of steel ensures that a fire resistant function is present. The use of PET for example ensures that the sandwich structure has a damping and insulating effect. Moreover, the use of aluminum provides mechanical stability and enables the housing to be produced of comparatively light weight in comparison to a sandwich structure comprising solely steel layers.

Providing a metal layer also ensures that the housing can be grounded to earth so that e.g. passengers of a motor vehicle can be protected from high voltages and currents that can indeed be present within the battery modules present in the housing.

Advantageously the sandwich structure is adapted to carry out at least one of the following functions, a fire protection function, a mechanical stabilizing function and a thermally insulating function. Thereby the safety related function of this component is ensured.

Preferably the plurality of layers of the sandwich structure can be connected to one another by bonding and/or by brazing and/or by welding and/or by pressing and/or by screwing/clamping and/or by gripping and/or by means of clinching.

Such means of connecting the individual panels/walls of a housing ensure that this can be stably connected to one another increasing the mechanical stability and safety of the housing.

Alternatively or additionally the safety related component of the housing may comprise a seal, the seal being designed as a predetermined breaking point.

Such a seal can advantageously be used to prevent the build-up of toxic gases within the housing that could lead to an explosion within the housing leading in a worst case scenario to a destruction of all of the battery modules and the battery cells accommodated therein.

Advantageously the housing comprises a plurality of walls connected to one another in a region of their respective sides, wherein the seal is arranged in the region of the connection between two adjacent walls, with the walls preferably being connected to one another by bonding and/or by brazing and/or by welding and/or by pressing and/or by screwing/clamping and/or by gripping and/or by means of clinching in the region of the connection, with a screwed connection being preferred in the region of the seal.

Providing the predetermined breaking point—the seal—in the region of a connection means that the components such as a battery module are protected. On the one hand, this protection helps against environmental conditions, such as rain, acting externally on the battery module. On the other hand, if a pressure increases within the housing, e.g. due the build-up of gases within the housing due to the failure of at least one battery cell, the seal acts as a pre-determined breaking point so that these gases can escape and thereby prevent at least a mechanical bursting of the housing that could cause damage internally to further battery cells or externally to people who could come into contact with debris brought about due to a mechanical bursting of the housing.

In this connection it can be noted that the PET layer of the sandwich structure can also have a damping effect on a bursting of the housing.

Preferably the seal is arranged in the region of the connection facing towards an outside surface of the housing.

This ensures that on an over pressure within the housing that the seal can effectively be transported out of its position and permit the dissipation of gases from within the housing.

Preferably the seal is selected from the group of materials comprising a foam or elastomer, EPDM, PE, PUR, PVC, PET, RTV or similar material.

Such seals advantageously ensure that the housing is sealed during a normal operation thereof and also permit a removal of the seal in the event of a build-up of pressure within the housing.

Preferably the seal is arranged between at least one side wall and a top wall of the housing. In particular, the seal is arranged A particularly advantageous kind of seal is currently sold under the trade name Tecoband 126 and is composed of EPDM rubber (ethylene propylene diene monomer (M-class) rubber).

Preferably the seal is arranged in a sealing gap provided at the housing, with the sealing gap preferably having a height selected in the range of from 1 mm to 10 mm, preferably of around 1.5 mm to 3 mm and especially of around 2 mm.

Such sealing gaps advantageously ensure the safety related function of the seal installed in the housing.

Alternatively or additionally the safety related component of the housing may comprise at least one pre-loading means that is adapted to pre-load components installed within the housing for a mechanical fixation thereof, the components including the at least one battery module.

Including mechanical damping means within the housing ensures that the components present in the housing are fixed in position and that connections, such as fluid connections, therebetween are not unnecessarily subject to loads which could cause these to become defunct. Moreover, such damping means also ensure that, for e.g. moveable battery module assemblies, the components are damped in the housing during the movement thereof.

Preferably the at least one pre-loading means comprises a damping layer and a rigid structure.

Providing both a damping layer and a rigid structure as a pre-loading means ensures that the damping layer can fill any possibly present void within the housing between the rigid structure ensuring an as homogenous as possible damping and embedding of the battery modules within the housing.

Advantageously the damping layer is selected from the group of layers comprising RTV foamed silicon, a fire resistant foam, a thermally insulating foam, or other elastomer materials and foams.

Such foams advantageously provide a damping function and optionally also provide a further safety related function.

The sandwich structure can be composed of two to five layers, preferably of 3 to 4 layers, of different materials, with the different materials being selected to bring about a different function.

Preferably the rigid structure comprises a metal, a plastic or ceramic material.

Such materials ensure that the damping material is deflected into any voids present between the individual components of the housing and the battery modules and walls of the housing.

Advantageously the rigid structure comprises individual sections of rigid material connected to one another at individual points to form a web-like structure.

Providing a web-like structure of rigid components ensures that an as homogenous as possible distributed of loads can achieved within the housing, so that all battery modules present within the housing are at best subjected to the same stabilizing loads.

In a further aspect the present invention relates to a battery module assembly, the assembly comprises at least one battery module, preferably at least two battery modules and most preferably 8 to 20 battery modules, installed in a housing in accordance with the invention.

Advantageously the battery module assembly further comprises at least one of the following elements a low voltage power supply, a high voltage output, a battery management system, a fluid cooling system comprising a fluid inlet and outlet arranged at a side of the housing, a temperature control and measurement system, a voltage control and measurement system, at least one thermal insulation element, a hydraulic system, electrical insulation elements, spacer elements, fire resistant elements, and anti-slip elements, as well as one or more fuses, one or more current sensors, contactors and pre-charge resistors, safety disconnects, voltage sensors, and monitoring microprocessor systems and sensors.

Such elements can advantageously be combined to ensure the correct and long term operation of a battery module assembly.

The advantages which were explained in connection with the various embodiments of the method in accordance with the invention are true in an analog manner for the adaptation of the cooling module in accordance with the invention as well as for the hollow section in accordance with the invention.

DRAWINGS

The invention will be described in detail in the following by means of embodiments with reference to the drawing, in which are shown.

DETAILED DESCRIPTION

Features having the same or a similar function will be provided with the same reference numeral in the following and it is naturally understood that the description which is provided for components or component functions in connection with an embodiment are also true for other embodiments in which the same reference numerals are used, unless something is said to the contrary.

Figure 1:
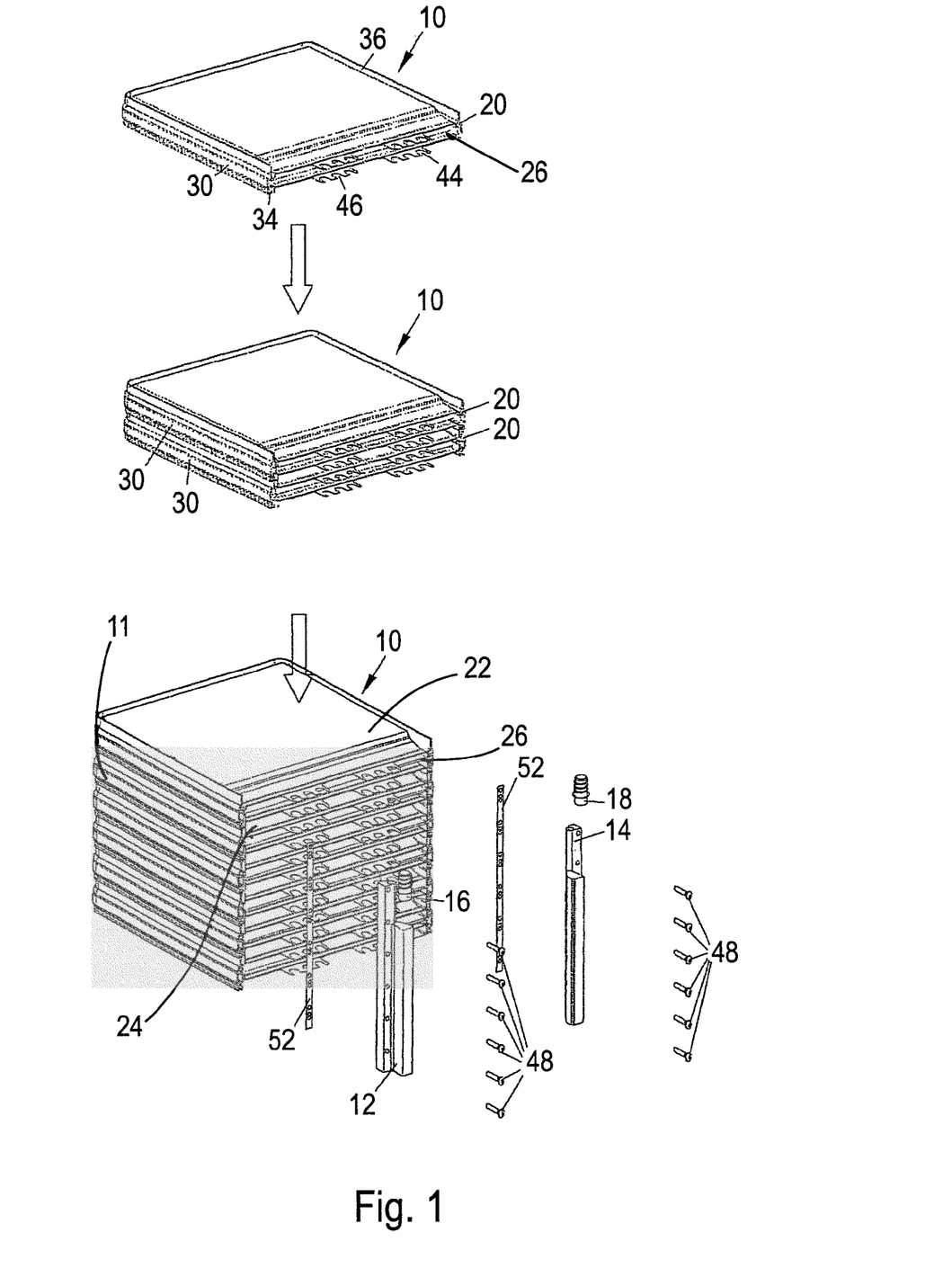
FIG. 1 a perspective illustration of a battery module.

The FIG. 1 shows a perspective illustration of a battery module 10 in accordance with the invention. The battery module 10 substantially has the shape of a parallelepiped and has a distributor 12 in its inlet region and a collector 14 in its outlet region. The distributor 12 and the collector 14 each have a connection 16, 18 by means of which a coolant can be supplied and/or removed. A cooling frame 11 is provided comprising six cooling passages 20 running in parallel to one another extend between the distributor 12 and the collector 14. The cooling passages 20 are formed in premade hollow sections 30. In order to ensure the cooling of the individual battery cells 22 which can be inserted into compartments 24 of the battery module 10, six cooling plates 26 extend substantially in parallel to the individual cooling passages 20 in the present example. The cooling plates 26 are introduced into premanufactured grooves (not shown) of a hollow section 30.

The FIG. 1 further shows exploded illustrations of hollow sections 30 which are U-shapedly bent. The U-shapedly bent hollow sections 30 comprise the so-called cooling plate 26 which can be inserted into the groove 28 after the bending of the hollow section 30. The hollow sections 30 respectively have tongue and groove connections at their top and bottom ends. A plurality of hollow sections 30 can be connected to one another via the tongue and groove connections.

Furthermore, the FIG. 1 shows battery cells 22 which each have positive and negative connections 44, 46 and which can e.g. be battery cells 22 for a traction battery (a so-called electric vehicle battery). The U-shaped shape of the hollow section 30 is matched to the shape of the battery cells 22 which should be provided in the battery module 10. This means that the hollow section 30 is bent such that the complete length of the battery cell 22 and the width of the battery cell 22 can be inserted into the individual compartments 24 of a battery module 10 without a problem; however, should still enable an assembly man and/or a mechanic to connect the contacts 44, 46 of the individual battery cells 22 to one another in order to provide a battery module 10 with the desired power.

After a hollow section 30 has been bent to a U-shape and the battery cells 22 have been inserted into their provided compartments 24, a plurality of these hollow sections 30 can be combined via the tongue and groove connections, as can be seen from FIG. 1, and, depending on the requirement, a battery module 10 can be provided having two and/or four and/or six, etc. of such battery cells 22. Once the desired number of battery cells 22 have been assembled in a battery module 10 having the U-shaped hollow sections, a sealing material 52 is attached at the respective inlet and/or outlet regions in order to manufacture a liquid-tight connection between the inlet region and/or the outlet region of the hollow sections 30 and the distributor 12 and/or the collector 14. The distributor 12 and/or the collector 14 can additionally still be screwed by means of screws 48 so that no or so little coolant as possible can exit at these connection points and/or in that, if possible, no coolant can exit at these connection points.

As can also be seen from FIG. 1, connection stubs 16, 18 for hoses 140 (see FIG. 9) can be respectively installed at the distributor 12 and/or collector 14. These can be an integral component of the distributor or collector, as illustrated in FIG. 1, or bonded and/or screwed and/or welded thereto.

Figure 2:
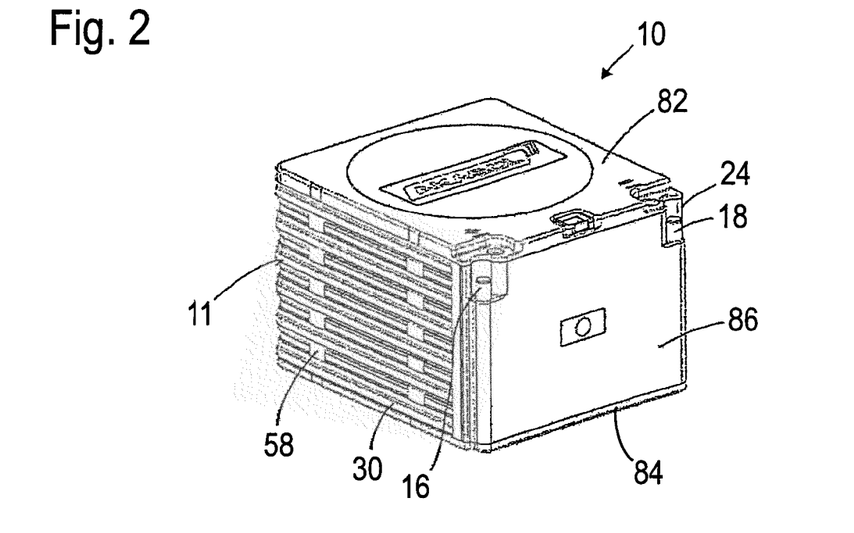
FIG. 2 a further perspective illustration of a battery module.

The distributor 12 and the collector 14 can be connected via a web and/or a yoke (not shown) in order to provide the battery module 10 with an increased stiffness and in order to serve as a connection possibility for an upper and/or lower finishing plate 82, 84 (see FIG. 2).

FIG. 2 shows how the upper and/or lower finishing plates 82, 84 can be attached at the uppermost and/or lowermost hollow section 30 of a connection module 10 generally by means of the respective tongue and groove 34, 36 in order to protect the lowermost and/or uppermost battery cell 22. FIG. 2 further shows a front plate 86 that is provided to protect the contacts 44, 46 of the battery cells and a possibly present battery management system (not shown) that are arranged there beneath.

The battery cells 22 can also be inserted into the coolant compartments 24 of the battery module 10 after the completion thereof. It is thereby avoided that these are damaged on brazing and/or welding or bonding of the distributor 12 or the collector 14.

Clamps 58 can also be seen in FIG. 2 that are provided to additionally clamp the hollow sections 30 to one another in addition to the tongue and groove connection.

Figure 3:
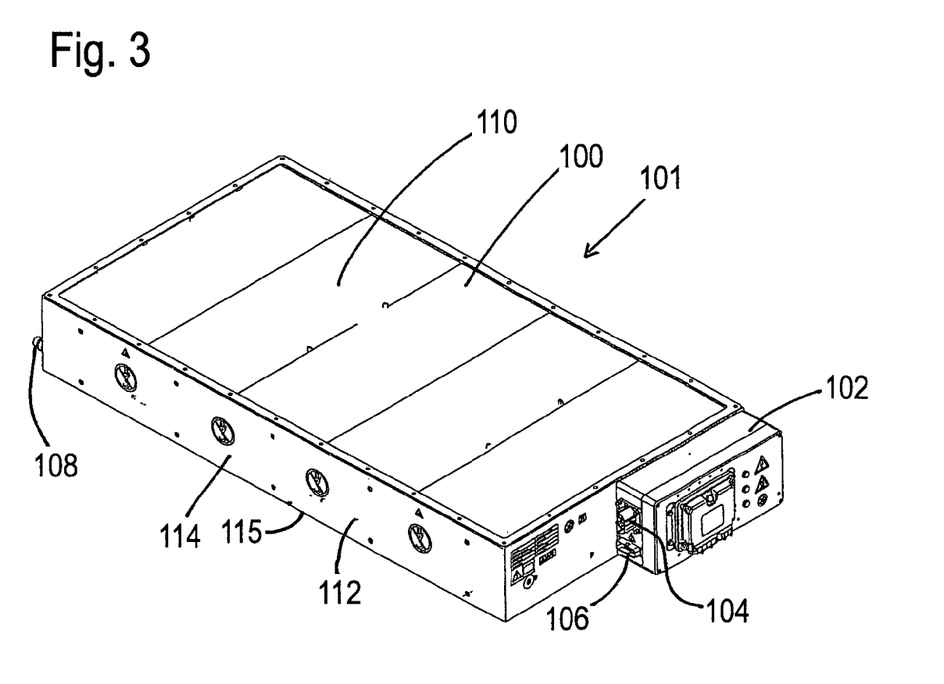
FIG. 3 a perspective view of a battery module assembly.

FIG. 3 shows a perspective view of a housing 100 of a battery module assembly 101. The housing 100 of the battery module assembly 101 houses a variety of components including at least one battery module 10. The housing 100 comprises a communication port 102 including a low voltage input/output connection 106 and a high voltage connection 104. The housing 100 further comprises a fluid port 108 via which a cooling fluid can be supplied to and/or extracted from the housing 100. The housing 100 is formed from a top wall 110, side walls 112 and a bottom housing part 114 comprising a bottom wall 115.

The housing generally has the shape of a parallelipid and can have dimensions of the order (width by height by length) of 150 cm by 50 cm by 750 cm. Generally speaking the size of the housing is selected in dependence on the number of battery modules housed therein. For example, housings for 8, 9, 12, 15, 20 battery modules 10 exist, nevertheless an arbitrary number of battery modules 10 can be included. The number of battery modules 10 selected depends on the application of the battery module assembly.

Figure 4:
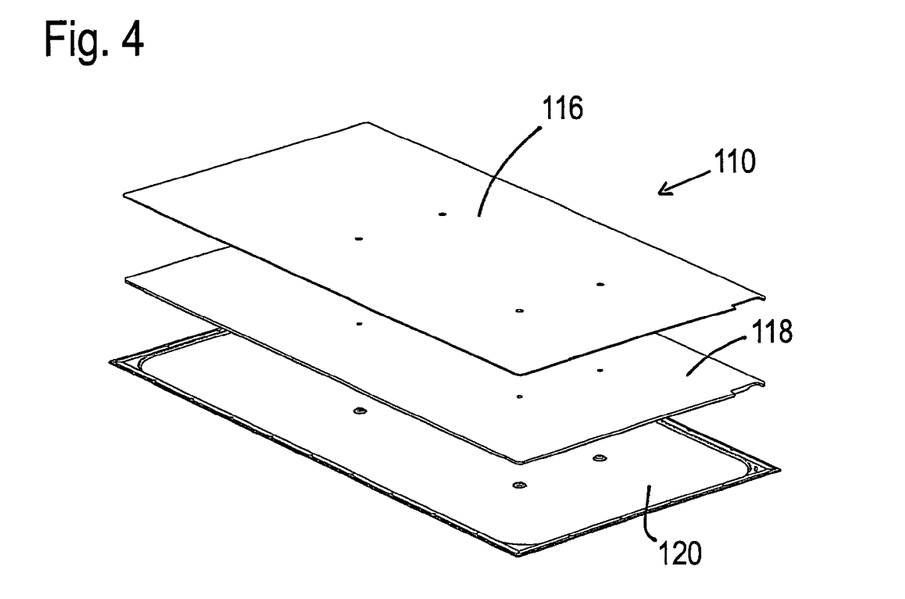
FIG. 4 a top wall of the battery module assembly of FIG. 3.

FIG. 4 shows an exploded view of the top wall 110 of the battery module assembly 101 of FIG. 3. The top wall 110 is composed of a so-called sandwich structure. In the present case the sandwich structure comprises three separate layers, A top layer 116 comprising aluminum, a middle layer 118 comprising PET and a bottom layer 120 comprising steel.

The individual layers typically have heights selected in the range of 0.1 to 50 mm. The layer thickness being selected in dependence on a possible function the layer should satisfy and/or the kind of material that is selected for the respective layer. The length and width of the layers are selected in dependence on the number of battery modules installed therein and the size of the battery module assembly.

Figure 5:
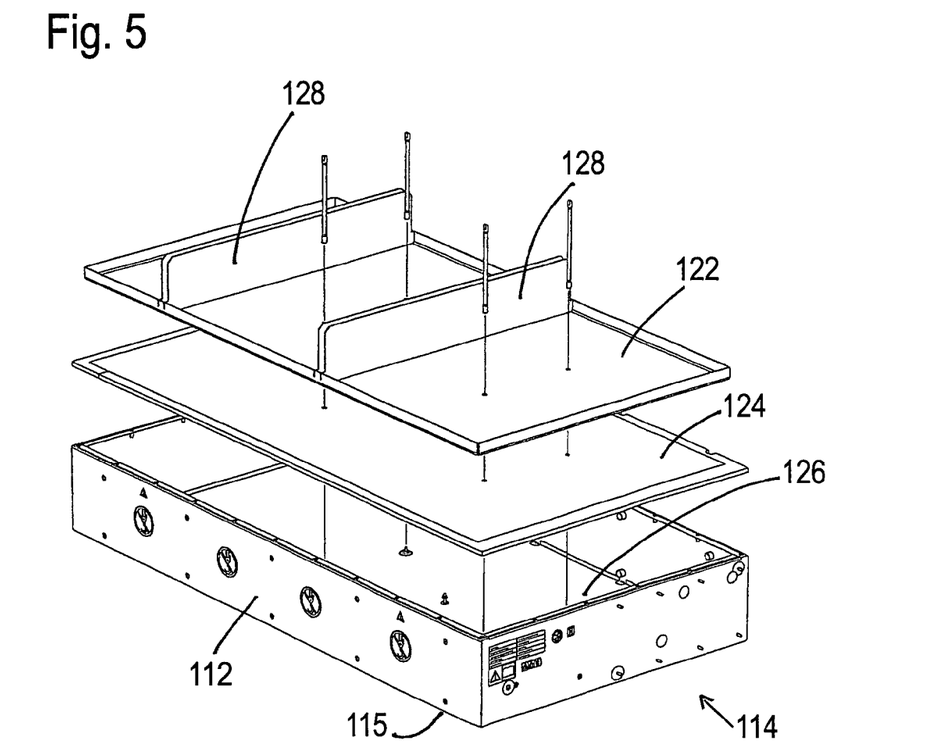
FIG. 5 a bottom housing part of the battery module assembly of FIG. 3.

FIG. 5 shows an exploded view of the bottom housing part 114 of FIG. 3. This comprises the side walls 112 and a bottom wall 115 of the battery module assembly 101 of FIG. 3. The bottom wall 115 is also composed of a so-called sandwich structure. In the present case the sandwich structure comprises three separate layers, A top layer 122 comprising aluminum, a middle layer 124 comprising PET and a bottom layer 126 comprising steel. Two spacer walls 128 are present on the aluminum layer 122. These act as spacer elements for battery modules that can be stored within the housing 100.

The spacer walls 128 can be made from at least one of the materials of which the top wall 110 and/or the bottom wall 115 are made of. This means they can also be selected to have a sandwich structure or be formed purely from one of the materials used in a sandwich structure.

Figure 6:
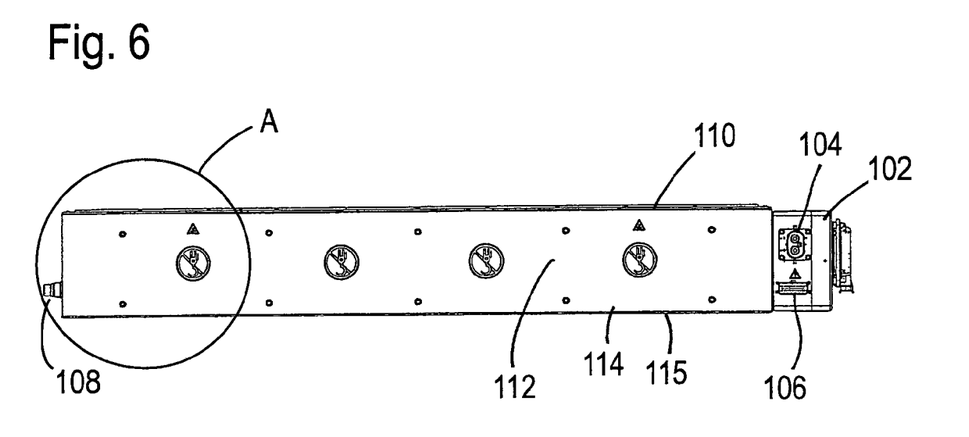
FIG. 6 a side view of the battery module assembly of FIG. 3.

FIG. 6 shows a side view of the housing 100 of FIG. 3. The fluid port 108 and the communication port 102 can readily be seen.

Figure 7:
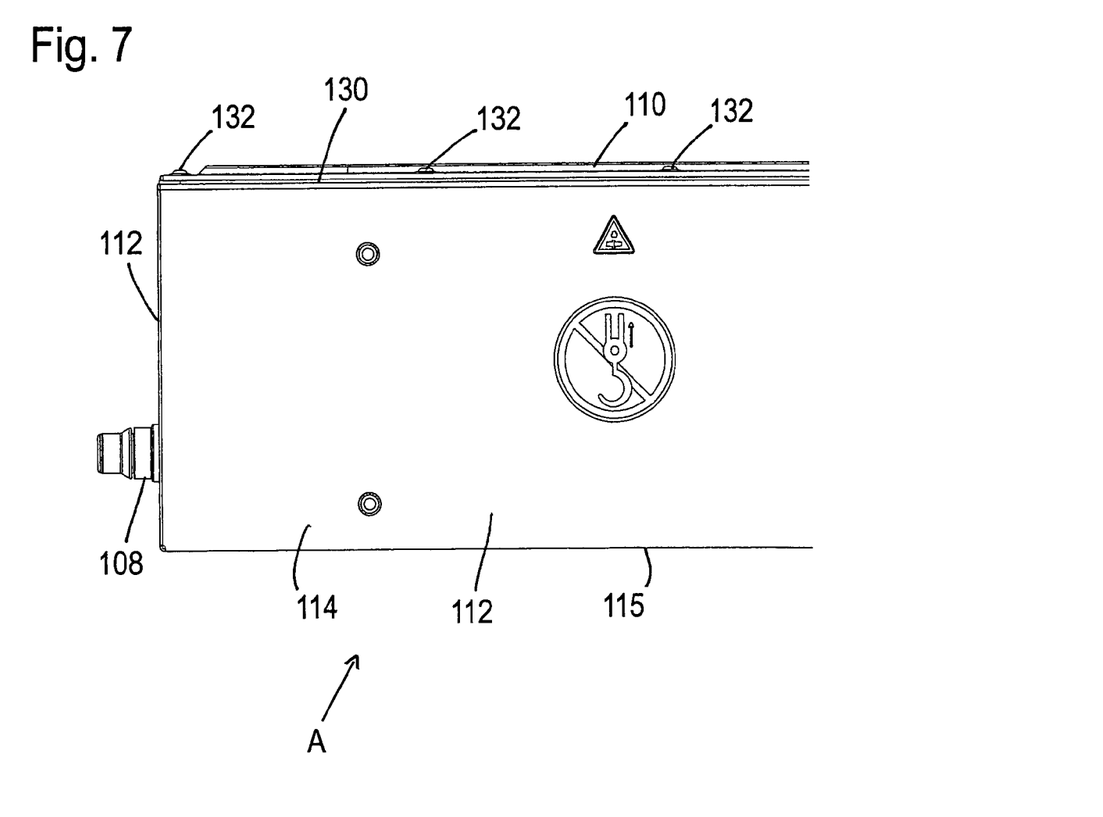
FIG. 7 a detailed view of region A of FIG. 6.

FIG. 7 shows a detailed view of Region A of FIG. 6. A seal 130 can be seen in the region of the boundary between the top wall 110 and the side walls 112. The seal 130 is configured as a pre-determined breaking point of the housing 100. On a failure of a battery cell 22, e.g. a Lithium ion battery cell, gases can be set free that can cause a build-up of pressure within the housing 100 if this is hermetically sealed.

On a build-up of pressure within the housing 100, the pressure could cause the further cells 22 of the battery modules 10 present in the housing 100 to be subjected to some form of mechanical wear or damage. The purpose of the seal 130 is to prevent the build-up of pressure within the housing 100. This is achieved in that the seal 130 can be displaced in a direction away from the interior of the housing 100. Through the provision of an abutment, e.g. a lip (both not shown), at the interior of the housing 100, the seal 130 is prevented from being displaced towards the interior of the housing 100.

Figure 8:
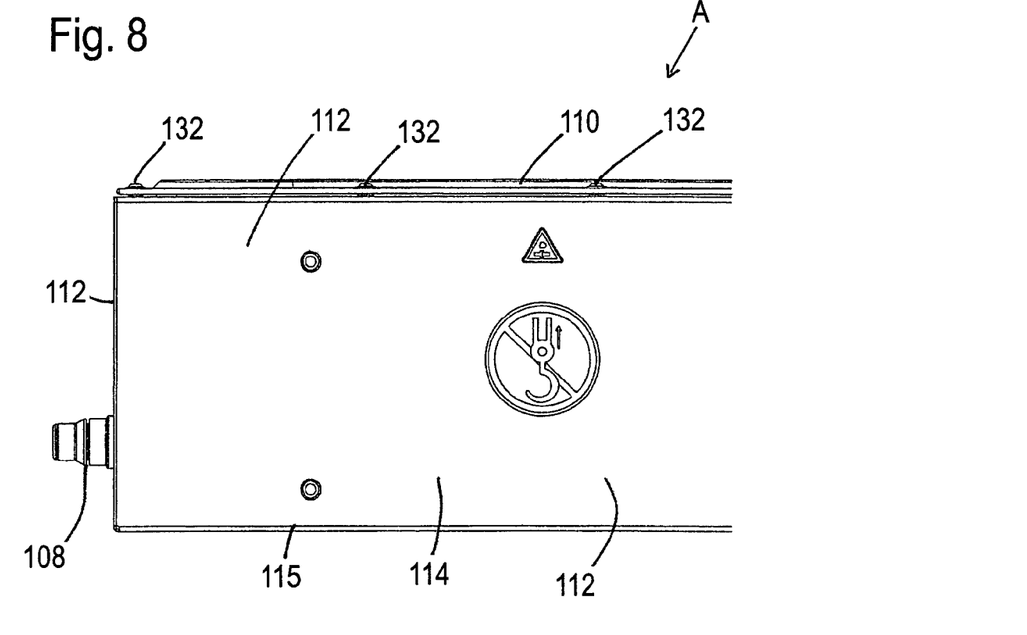
FIG. 8 a further detailed view of region A of FIG. 6 with a seal removed.

FIG. 8 shows a further detailed view of region A of FIG. 6. In this view the seal 130 has been removed for the purpose of illustration. Due to the omitted seal, one can see bolts 132 used to attach the top wall 110 to the side walls 112 of the housing.

Figure 9:
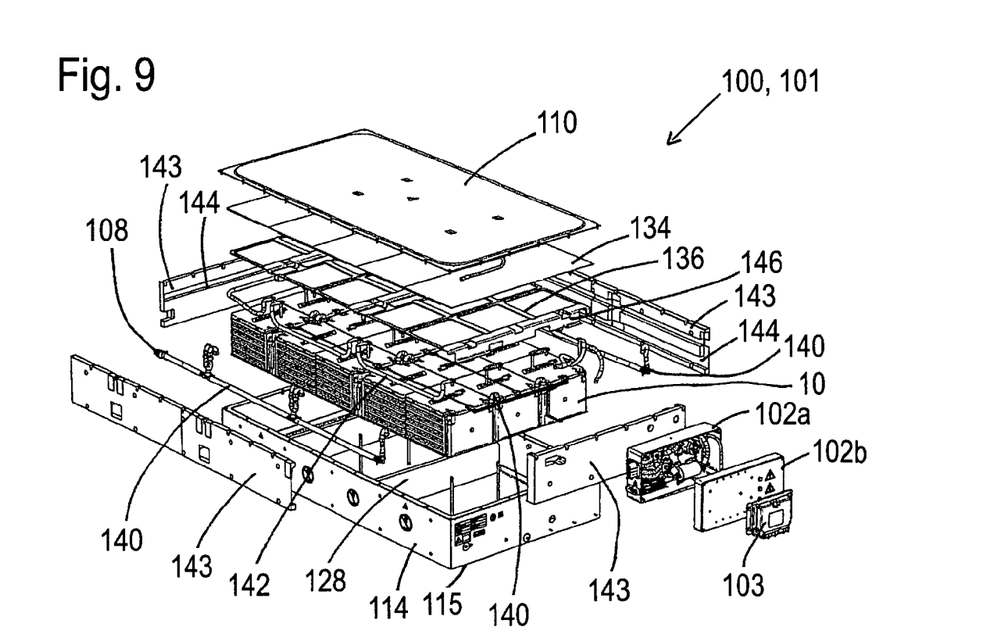
FIG. 9 an exploded view a battery module assembly with components present therein.

FIG. 9 shows a first exploded view of the components that are housed in a housing 100 for a battery module assembly 101. The housing 100 is configured to accommodate 15 battery modules 10. The battery modules 10 are installed between the side walls 112 and spacer walls 128.

FIG. 9 shows an exploded view of a battery module assembly 101 form an end having the communication port 102. The communication port 102 comprises a base housing 102a and a cover 102b. A global battery management system 103 is provided at the communication port 102. The battery management system is configured to measure the temperatures, voltages of at least each battery module 10, preferably for each battery cell 22 of each battery module 10, in order to determine the status of each battery module 10/battery cell 22. The battery module 10 can initiate commands relative to the heating and/or charging of each battery module 10 and also output signals when a failure of a battery module 10 is too be feared.

The housing 100 accommodates a layer of damping material 134 that is arranged beneath the top wall 110 and above a rigid structure 136. On assembly of the housing 100, the rigid structure 136 displaces the damping layer 134 into any possibly present voids.

As the battery modules 10 are fluid cooled, fluid lines 140 are further present within the housing 100. These and electrical supply and/or discharge lines 142 are guided partly within thermal insulation mats 143 present between the battery modules 10 and the side walls 112 or between the battery modules 10 and the damping layer 134. Voids can be present between any of these components and the damping layer 134 in conjunction with the rigid structure 136 are configured to fill these voids. Thereby the damping layer 134 and the rigid structure 136 act as damping means in order to mechanically fix the components present in the housing 100.

The fluid lines 140 and the electrical supply and/or discharge lines 142 are guided at least partly within channels 144 formed within the thermal insulation mats 143. As the battery modules 10 are designed to store comparatively high potentials, electrical insulation is also provided in the form of insulators 146. The insulators 146 are installed in the region of the electrical input/output contacts of the individual battery module 10 (see also FIG. 10 in this regard) and are provided to protect electrical short cuts from arising in the region of the electrical supply and/or discharge lines 142.

Figure 10:
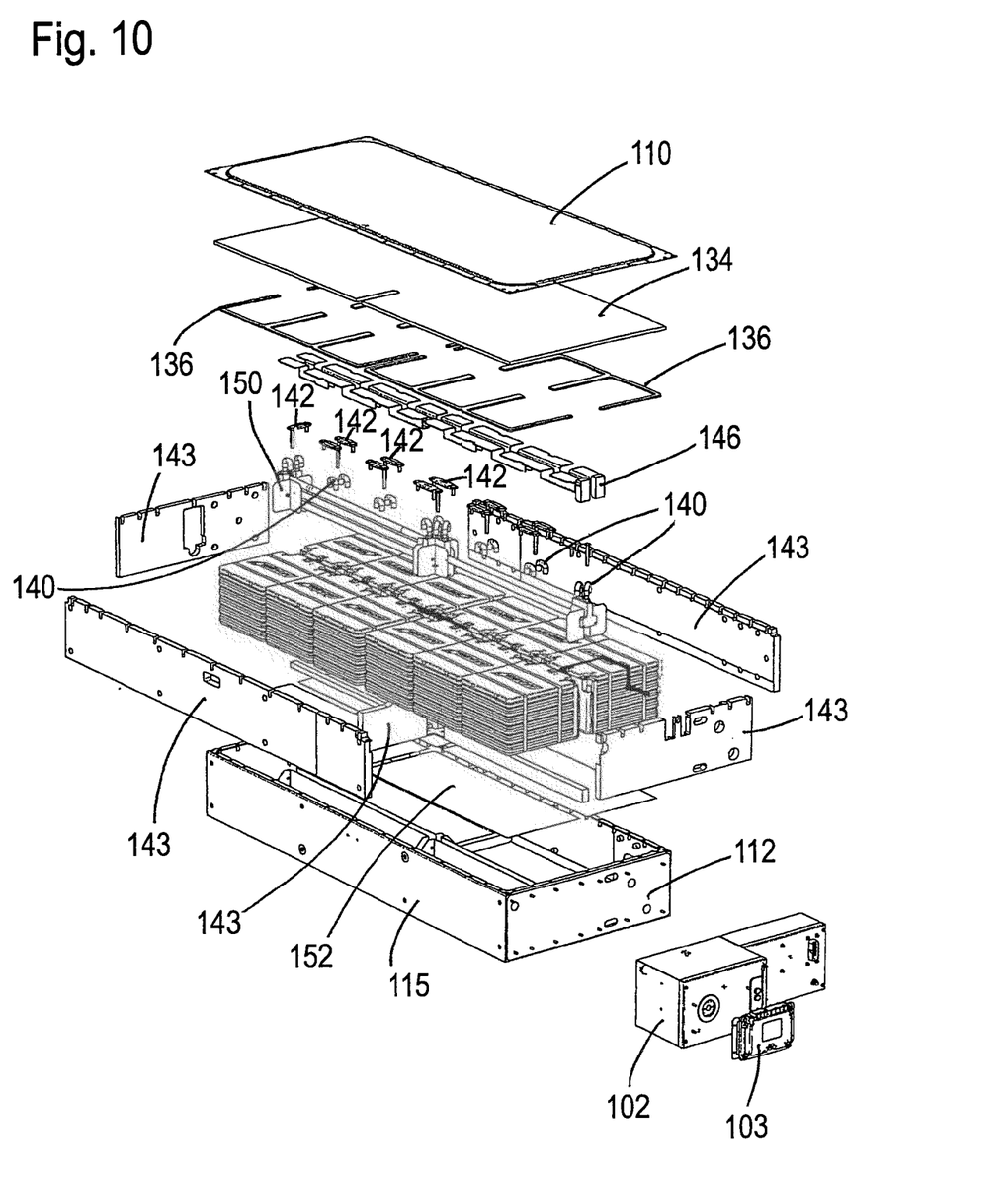
FIG. 10 a further exploded view of a battery module assembly with components present therein.

FIG. 10 shows a further exploded view of a battery module assembly 101. In the example of FIG. 10 12 battery modules 10 are accommodated within the housing 100.

The electrical supply and/or discharge lines 142 are clearly visible in the region of a fluid supply system 150 having the fluid lines 140 respectively connecting the collector 14 of one battery module 10 to the distributor 12 of a further battery module 10.

An anti-slip mat 152 has been provided on the surface of the top layer 122 as a further mechanical fixation means for the battery modules 10. This anti-slip mat 152 could also be provided in the form of a surface structure (not shown) provided on the damping layer 134.

The invention claimed is:

1. A housing for at least one battery module, wherein the at least one battery module comprises a plurality of battery cells arranged in a fluid cooled frame, the housing comprising:
   at least one wall formed from a sandwich structure, the sandwich structure comprising a plurality of layers of different materials;
   a top wall and a bottom wall with the at least one battery module disposed between the top and bottom walls; and
   at least one pre-loading means that is adapted to pre-load components installed within the housing for a mechanical fixation thereof, the components including the at least one battery module;
   wherein the at least one pre-loading means comprises a damping layer and a rigid structure, with the damping layer being disposed between the rigid structure and the top wall of the housing;
   the damping layer is selected from the group of layers consisting of RTV foamed silicon, a fire resistant foam, and a thermally insulating foam.

2. The housing in accordance with claim 1, wherein the housing further comprises a predetermined breaking point in the form of a seal.

3. The housing in accordance with claim 1, wherein the at least one wall formed from the sandwich structure is the top wall or the bottom wall of the housing.

4. The housing in accordance with claim 1, wherein the sandwich structure comprises two to five layers of material, with adjacent layers being selected from different materials.

5. The housing in accordance with claim 1, wherein at least one layer of the plurality of layers of the sandwich structure comprises a material selected from the group of materials consisting of aluminum and PET.

6. The housing in accordance with claim 1, wherein the sandwich structure is adapted to carry out at least one of a fire protection function and a mechanical stabilizing function.

7. The housing in accordance with claim 1, wherein the plurality of layers of the sandwich structure are connected to one another by bonding and/or by brazing and/or by welding and/or by pressing and/or by clamping and/or by gripping.

8. The housing in accordance with claim 1, further comprising at least one of the following elements: a fluid cooling system comprising a fluid inlet and outlet arranged at a side of the housing, at least one thermal insulation element, a hydraulic system, a plurality of fire resistant elements, a plurality of anti-slip elements, at least one fuse, at least one current sensor, a plurality of contactors, a plurality of pre-charge resistors, a plurality of safety disconnects, a plurality of voltage sensors, a plurality of monitoring microprocessor systems, and a plurality of sensors.

9. A housing for at least one battery module, with the at least one battery module comprising a plurality of battery cells, the housing comprising:
- a fluid cooled frame;
- at least one pre-loading means that is adapted to pre-load components installed within the housing for a mechanical fixation thereof, the components including the at least one battery module;
- a top wall and a bottom wall with the at least one battery module disposed between the top and bottom walls; and
- wherein the at least one pre-loading means comprises a damping layer and a rigid structure, with the damping layer comprising a foam layer disposed between the rigid structure and the top wall of the housing;
- wherein the housing comprises at least one wall formed from a sandwich structure, the sandwich structure comprising a plurality of layers of different materials.

10. The housing in accordance with claim 9, wherein the damping layer is selected from the group of layers consisting of: silicon foam, a fire resistant foam, a thermally insulating foam, or other elastomer materials and foams, and the rigid structure comprises a plastic or ceramic material.

11. The housing in accordance with claim 9, wherein the rigid structure comprises individual sections of rigid material connected to one another at individual points to form a web-like structure.

12. The housing in accordance with claim 9, further comprising at least one of the following elements: a fluid cooling system comprising a fluid inlet and outlet arranged at a side of the housing, at least one thermal insulation element, a hydraulic system, a plurality of fire resistant elements, a plurality of anti-slip elements, at least one fuse, at least one current sensor, a plurality of contactors, a plurality of pre-charge resistors, a plurality of safety disconnects, a plurality of voltage sensors, a plurality of monitoring microprocessor systems, and a plurality of sensors.

* * * * *